(12) United States Patent
Ozawa et al.

(10) Patent No.: US 11,993,183 B2
(45) Date of Patent: May 28, 2024

(54) SEAT SLIDE DEVICE

(71) Applicant: Adient US LLC, Plymouth, MI (US)

(72) Inventors: Motohiko Ozawa, Kanagawa (JP);
Naoto Komiya, Kanagawa (JP);
Atsunori Matsui, Kanagawa (JP);
Yunxiao Li, Kanagawa (JP);
Laxmikant Indi, Kanagawa (JP);
Frederick L. Wilkinson, Plymouth, MI (US); Sean M. Osinski, Plymouth, MI (US); Valentin Muresan, Plymouth, MI (US); Wenting Zhang, Shanghai (CN)

(73) Assignee: Adient US LLC, Plymouth, MI (US)

( * ) Notice: Subject to any disclaimer, the term of this patent is extended or adjusted under 35 U.S.C. 154(b) by 303 days.

(21) Appl. No.: 17/565,533

(22) Filed: Dec. 30, 2021

(65) Prior Publication Data

US 2023/0211708 A1 Jul. 6, 2023

(51) Int. Cl.
*B60N 2/07* (2006.01)
*B60N 2/08* (2006.01)

(52) U.S. Cl.
CPC .......... *B60N 2/0727* (2013.01); *B60N 2/073* (2013.01); *B60N 2/0837* (2013.01); *B60N 2/07* (2013.01); *B60N 2/0705* (2013.01); *B60N 2/0715* (2013.01); *B60N 2/0722* (2013.01); *B60N 2/0732* (2013.01); *B60N 2/0806* (2013.01); *B60N 2/0818* (2013.01); *B60N 2/0875* (2013.01); *B60N 2/0887* (2013.01); *B60N 2/0893* (2013.01)

(58) Field of Classification Search
CPC .... B60N 2/0727; B60N 2/073; B60N 2/0837; B60N 2/0732; B60N 2/0705; B60N 2/0715; B60N 2/0875; B60N 2/0893; B60N 2/0818; B60N 2/07; B60N 2/0722; B60N 2/0806; B60N 2/0887
USPC ...................................... 296/65.13
See application file for complete search history.

(56) References Cited

U.S. PATENT DOCUMENTS 10,730,408 B2 * 8/2020 Masuda ................. B60N 2/085

FOREIGN PATENT DOCUMENTS

JP   4171125 B2 * 10/2008
JP   4171125 B2   10/2008

* cited by examiner

*Primary Examiner* — Amy R Weisberg
*Assistant Examiner* — Dana D Ivey
(74) *Attorney, Agent, or Firm* — Marshall & Melhorn, LLC (57) ABSTRACT

A seat slide device includes a pair of sliders each including a fixed rail, a movable rail slidably guided by the fixed rail, a bracket on the movable rail configured so that front and rear sides swing opposite to each other in a vertical direction with a longitudinal-intermediate part as a fulcrum, a support bracket supported on the bracket via a hinge and configured to rotate in only one direction from a predetermined orientation about an lateral-direction axis relative to the bracket, a movement-restricting portion configured to restrict sliding of the movable rail while a rear part of the bracket is raised and to release the restriction while the rear part of the bracket is lowered; and a towel bar connecting each support bracket. The hinge part prohibits a rotation of the support bracket while the towel bar is lifted and permits the rotation while the towel bar is lowered.

2 Claims, 9 Drawing Sheets

SEAT SLIDE DEVICE

TECHNICAL FIELD

The present disclosure relates to a seat sliding device.

BACKGROUND

JP 4171125 B2 (Patent Document 1) describes a slide structure configured to slide a vehicle seat. The slide structure described in Patent Document 1 includes lower channels, upper channels, movement restricting portions, and a towel bar. A pair of the lower channels are laid apart in a width direction on a floor of a vehicle. Each upper channel is guided by each lower channel and is configured to slide forward and backward. Each movement restricting portion locks the slide movement of the upper channels relative to the lower channel. The towel bar has a U-shape having a pair of arm parts, and tips of the arm parts are respectively connected to front parts of the movement restricting portions and arranged at the lower part of the seat.

In this slide structure, a connection part of the towel bar extending in the width direction of the vehicle is positioned at a front lower part of the seat. In the slide structure, locking of the slide movement by the movement restricting portions is configured to be released by an occupant's lifting of the connection part by hand.

SUMMARY

In the slide structure of the seat described in Patent Document 1, when the floor is deformed such that one rear end side of one lower channel of the pair of lower channels is lifted due to a collision of the vehicle, for example, the arm part of the towel bar connected to the front part of the movement restricting portion may be relatively lifted from a position before the collision, and the locking of slide movement may be released.

An object of the present disclosure is to provide a seat slide device in which the locking of slide movement of a seat is less likely to be released even when the floor is deformed.

The seat slide device according to one or more embodiments includes following configurations, A seat slide device includes an inner slider and an outer slider disposed apart from each other in a lateral direction of a floor of a vehicle, and a towel bar. Each of the inner slider and the outer slider includes a fixed rail laid on the floor in a position extending in a front-rear direction, a movable rail fixed to a lower portion of a seat of the vehicle and configured to be slidably guided by the fixed rail, a bracket disposed on the movable rail with the front-rear direction as a longitudinal direction and configured so that a front side and a rear side swing opposite to each other in a vertical direction with a longitudinal intermediate part as a fulcrum, a support bracket mounted onto the bracket via a hinge part arranged on the front side of the fulcrum on the bracket and configured to be rotate in only one direction from a predetermined normal orientation about an axis extending in the lateral direction with respect to the bracket, and a movement restricting portion configured to restrict sliding movement of the movable rail while a rear end of the bracket is raised and to release the restriction against sliding movement of the movable rail while the rear end of the bracket is lowered. The towel bar is arranged at a front lower part of the seat and connected and is fixed to a front part of the support bracket of the inner slider and a front part of the support bracket of the bracket of the outer slider so as to be connected to each of the inner slider and the outer slider. When the support bracket is in the predetermined normal orientation, the hinge part prohibits a rotation of the support bracket while the towel bar is lifted, so that the support bracket and the bracket are integrally lifted, and the hinge part permits the rotation of the support bracket while the towel bar is lowered, so that the front part of the support bracket is lowered independently with respect to the bracket, Each of the inner slider and the outer slider may further include a biasing member, the biasing member configured to bias the support bracket to be in a rotational position of the normal orientation with respect to the bracket.

According to a configuration of the seat slide device described above, even if the floor is deformed, the locking of slide movement of a seat is less likely to be released.

DETAILED DESCRIPTION

A seat slide device according to one or more embodiments will be described with reference to the drawings. The same functions and configurations are denoted by the same or similar reference numerals, and description thereof will be omitted as appropriate. A seat slide device 91 according to one or more embodiments is a device configured to slide a vehicle seat. A vehicle is, for example, an automobile.

Figure 1:
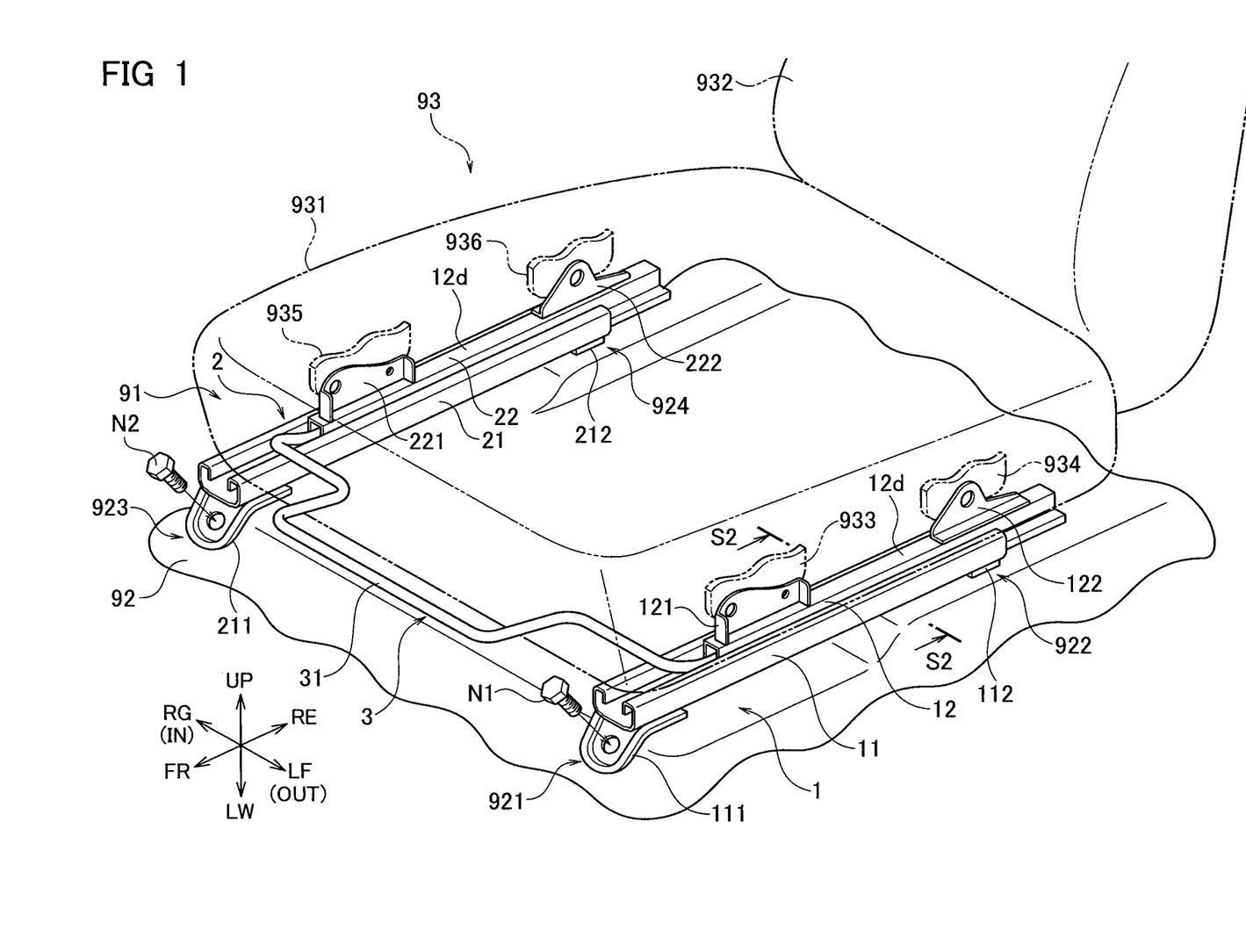
FIG. 1 is a perspective view illustrating a seat slide device according to one or more embodiments laid on a floor of a vehicle.

First, an outline of the configuration of the seat slide device 91 will be described with reference to FIG. 1. Hereinafter, the respective directions of the front FR, the rear RE, the left LF, the right RG, the upper UP, and the lower LW are defined in the directions illustrated by arrows in FIG. 1. FIG. 1 illustrates a state in which a front passenger seat 93 of a vehicle of a right-hand-drive vehicle is mounted to be slidable in a front-rear direction with respect to a floor 92 by a seat slide device 91. A lateral direction (left-right direction) in FIG. 1 is a width direction of the vehicle. In FIG. 1, a right side is an inner side of the vehicle, and a left side is an outer side of the vehicle.

The seat slide device 91 includes an outer slider 1, an inner slider 2, and a towel bar 31. The towel bar 31 is provided in the seat slide device 91 as a towel bar assembly 3 previously connected to a support bracket 51 of the outer slider 1 and a support bracket 61 of the inner slider 2. The outer slider 1 and the inner slider 2 are assemblies having the same structure which are generally straight. The outer slider 1 and the inner slider 2 are laid in parallel on the floor 92 in a position apart from each other in the width direction and extending in the front-rear direction.

The outer slider 1 has a fixed rail 11 and a movable rail 12 configured to be engaged with the fixed rail 11 and to be slidable in the front-rear direction. The fixed rail 11 has a substantially squared U-shape in cross section. The fixed rail 11 is laid on the floor 92 in such an orientation that an open side of the squared U-shape faces upward.

A foot bracket 111 is fixed to a lower surface at a front tip part of the fixed rail 11 by welding. A foot bracket 112 is fixed to the lower surface at a rear tip part of the fixed rail 11 by welding. The foot bracket 111 is fixed to a floor fixing portion 921 of the floor 92 by a fixing bolt N1. The foot bracket 112 is also fixed to a floor fixing portion 922 of the floor 92 by fixing bolts (not illustrated). Thus, the outer slider 1 is laid on the floor 92.

The movable rail 12 has a substantially squared U-shape in cross section. The movable rail 12 is engaged with an inner side of the fixed rail 11 in an orientation in which an open side of the squared U-shape faces downward, and is slidable in the front-rear direction. A seat bracket 121 is fixed to an upper surface at a front tip part of the movable rail 12. A seat bracket 122 is fixed to the upper surface at a rear tip part of the movable rail 12.

The towel bar assembly 3 is an operation lever configured to release locking of the slide movement of the outer slider 1 and the inner slider 2. The towel bar assembly 3 includes a towel bar 31 which is an operation part of the operation lever. The towel bar 31 has a pair of arm parts and is formed in a substantially U-shape, and tip parts of the pair of arm parts are respectively connected to the outer slider 1 and the inner slider 2.

The inner slider 2 has the same structure as that of the outer slider 1 as described above. That is, the inner slider 2 has a fixed rail 21, a movable rail 22, foot brackets 211, 212 and seat brackets 221, 222 corresponding to the fixed rail 11, the movable rail 12, the foot brackets 111, 112 and the seat brackets 121, 122 of the outer slider 1, respectively. The foot bracket 211 of the fixed rail 21 is fixed to a floor fixing portion 923 of the floor 92 by a fixing bolt N2. The foot bracket 212 of the fixed rail 21 is fixed to a floor fixing portion 924 by a fixing bolt (not illustrated). Thus, the inner slider 2 is laid on the floor 92.

The seat 93 is illustrated in FIG. 1 by a dashed-and-double-dotted line. The seat 93 has a seat cushion 931 and a seat back 932. Frame legs 933, 934, 935, 936 provided on the lower portion of a cushion frame (not illustrated), the cushion frame serving as a framework of the seat cushion 931, are fixed to the seat brackets 121, 122, 221, 222 by bolts (not illustrated). Thus, the seat 93 and the seat slide device 91 are integrated, and the seat 93 is configured to be slidable relative to the floor 92 through the seat slide device 91.

The outer slider 1 of the seat slide device 91 has a movement restricting portion 4 including a latch plate 41, a cutout 11c, an insertion hole 12c and a bracket 52 described below. The movement restricting portion 4 prohibits (locks) the slide movement of the movable rail 12 while the towel bar 31 is at a normal position, and permits (unlocks) the slide movement while a front part of the towel bar 31 is lifted. The inner slider 2 also has a movement restricting portion 4 of the same structure. Hereinafter, with reference to FIGS. 2 to 8, the movement restricting portion 4 and the towel bar assembly 3 will be described in detail with the outer slider 1 as a representative.

Figure 2:
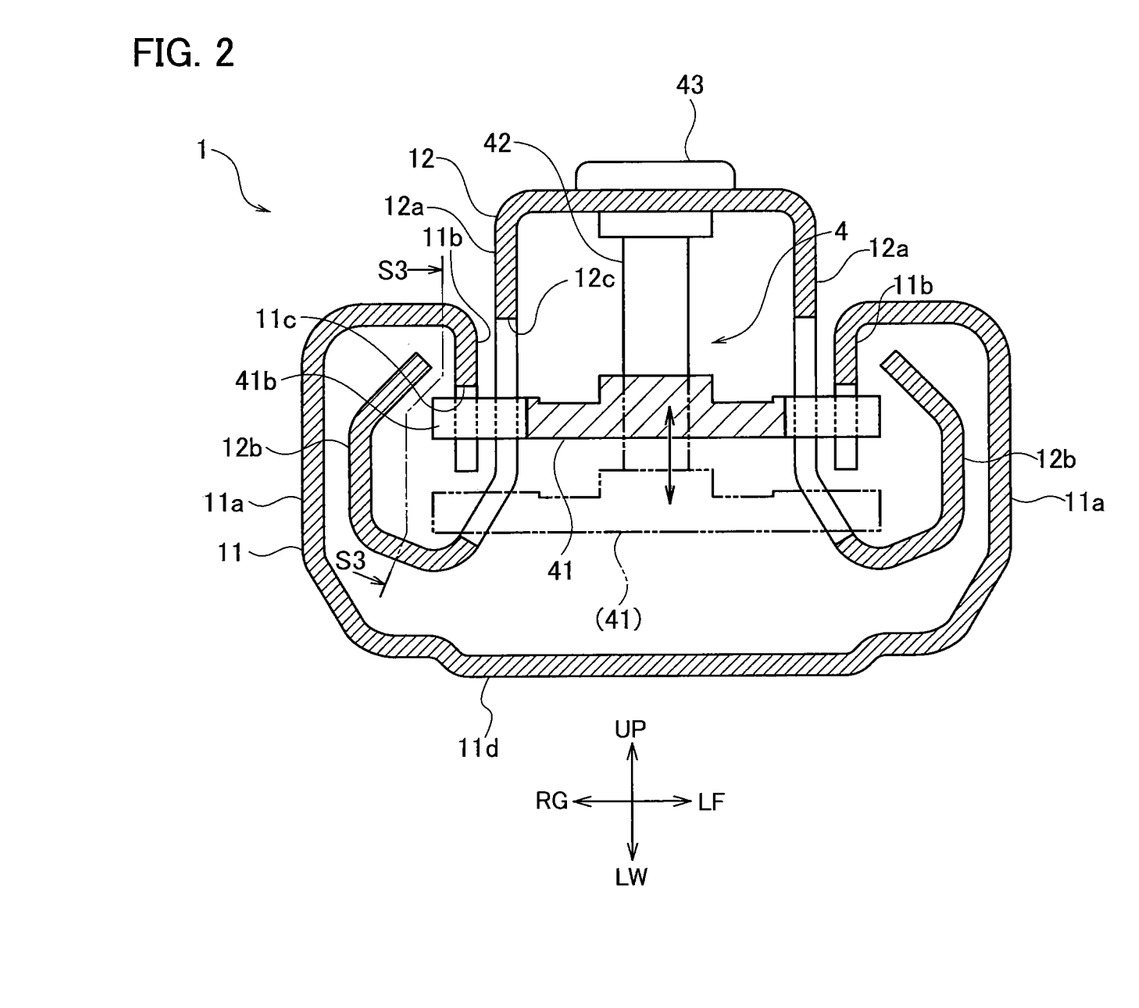
FIG. 2 is a cross-sectional view at position S2-S2 of FIG. 1.
Figure 3:
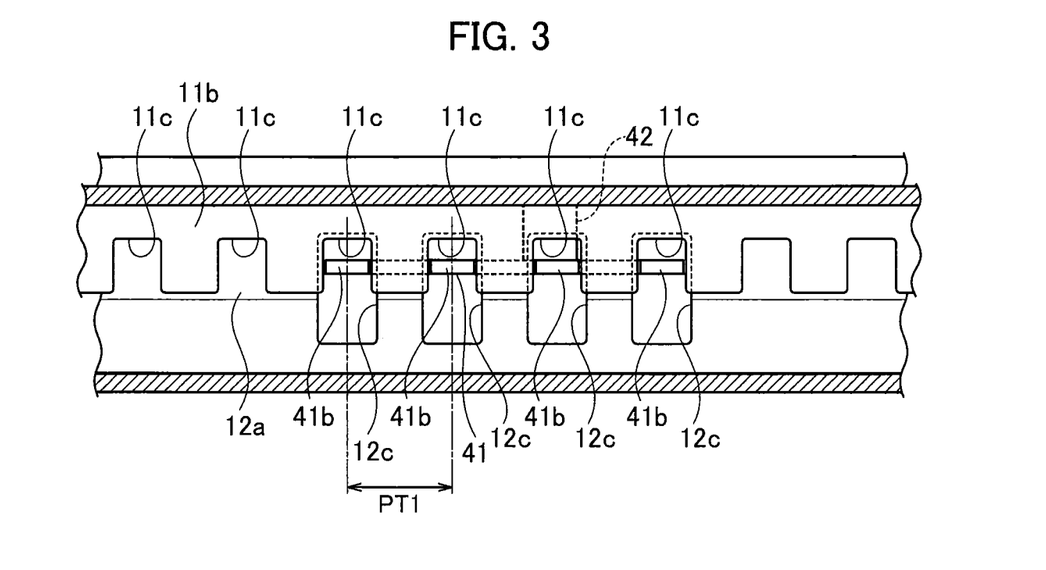
FIG. 3 is a partial sectional view of an outer slider of the seat slide device in a locked state at position S3-S3 of FIG. 2.
Figure 4:
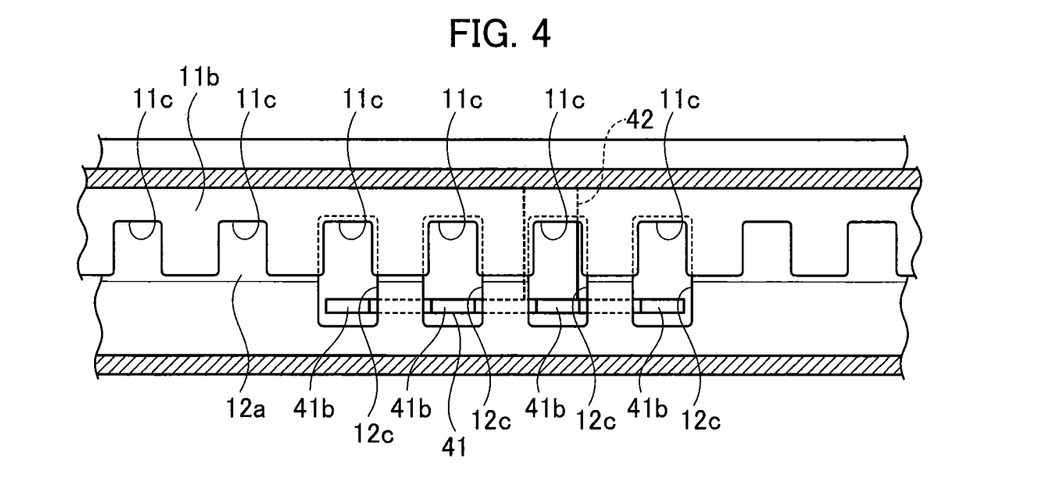
FIG. 4 is a partial cross-sectional view of the outer slider in an unlocked state at position S3-S3 of FIG. 2.
Figure 5:
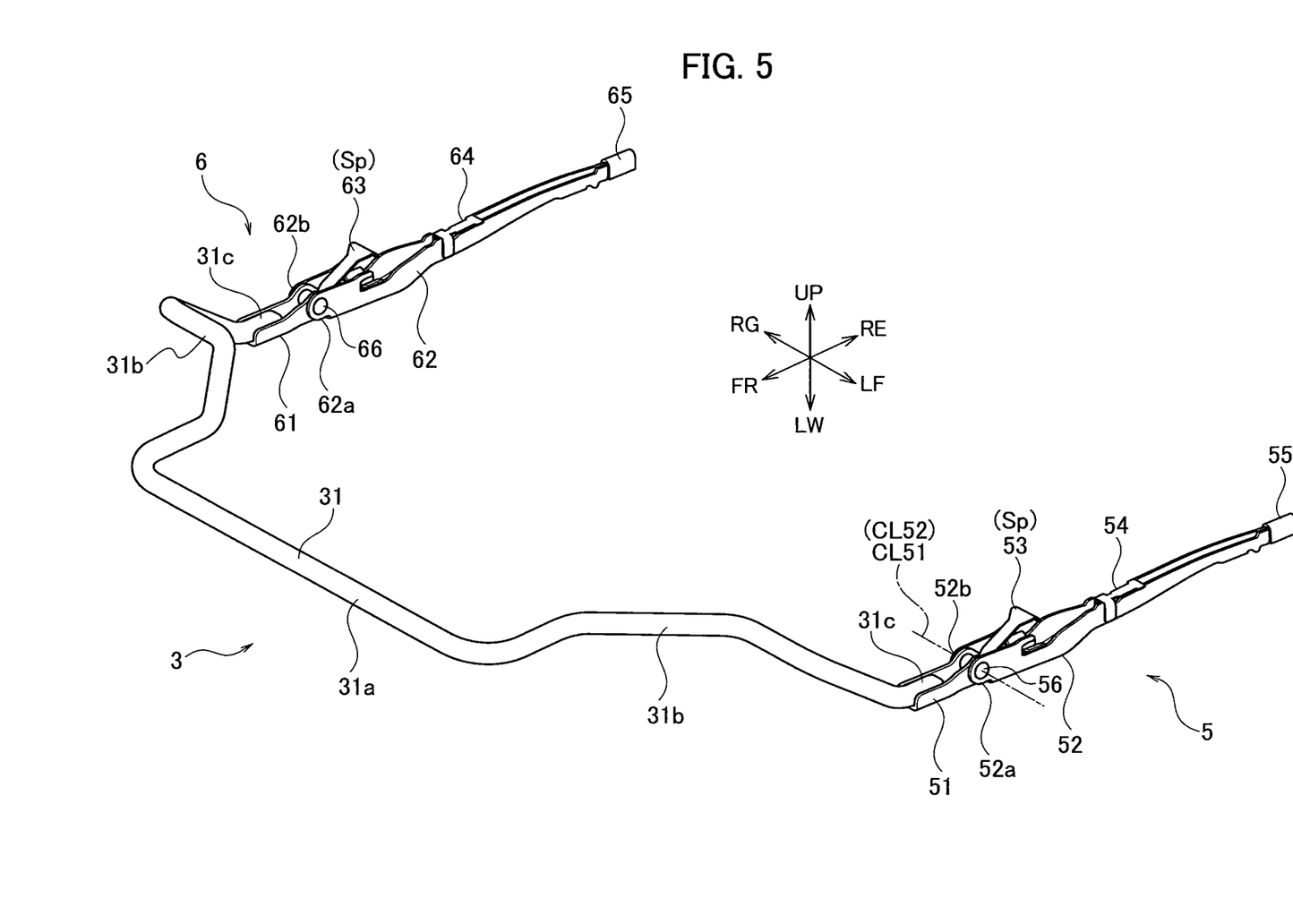
FIG. 5 is a perspective view of a towel bar assembly of the seat slide device.
Figure 6:
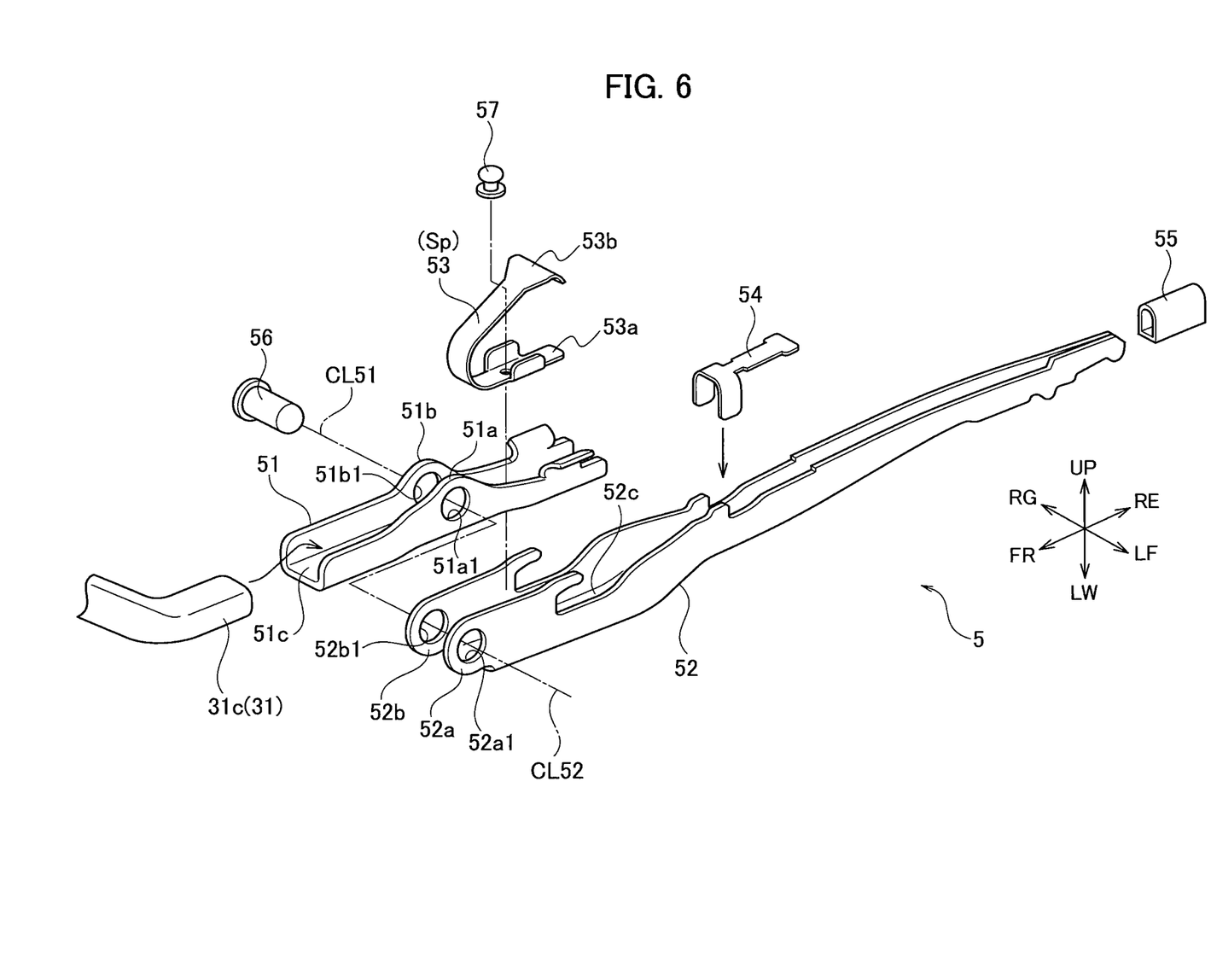
FIG. 6 is an exploded perspective view of an outer assembly of the towel bar assembly.
Figure 7:
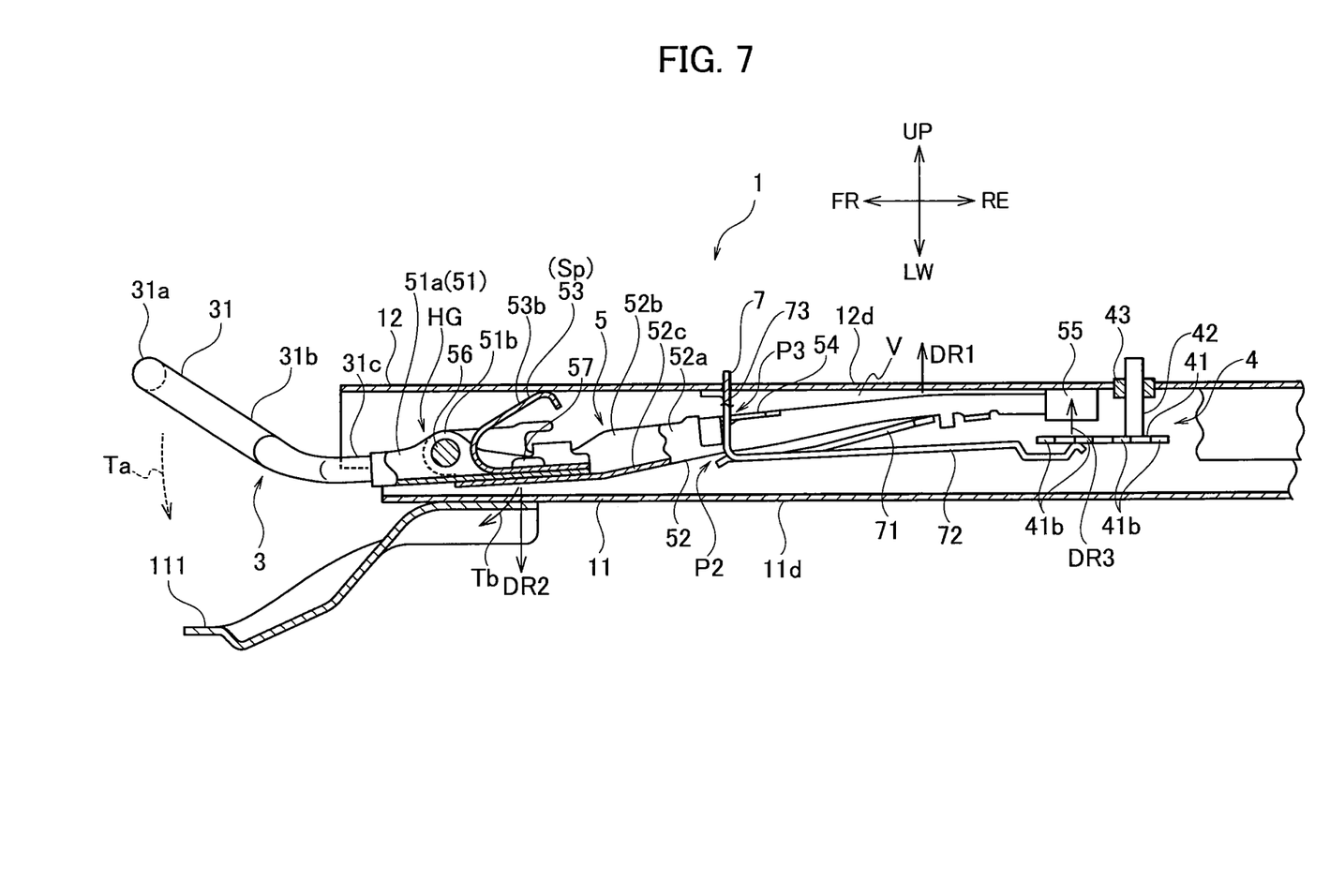
FIG. 7 is a longitudinal cross-sectional view of the front part of the outer slider in the locked state.
Figure 8:
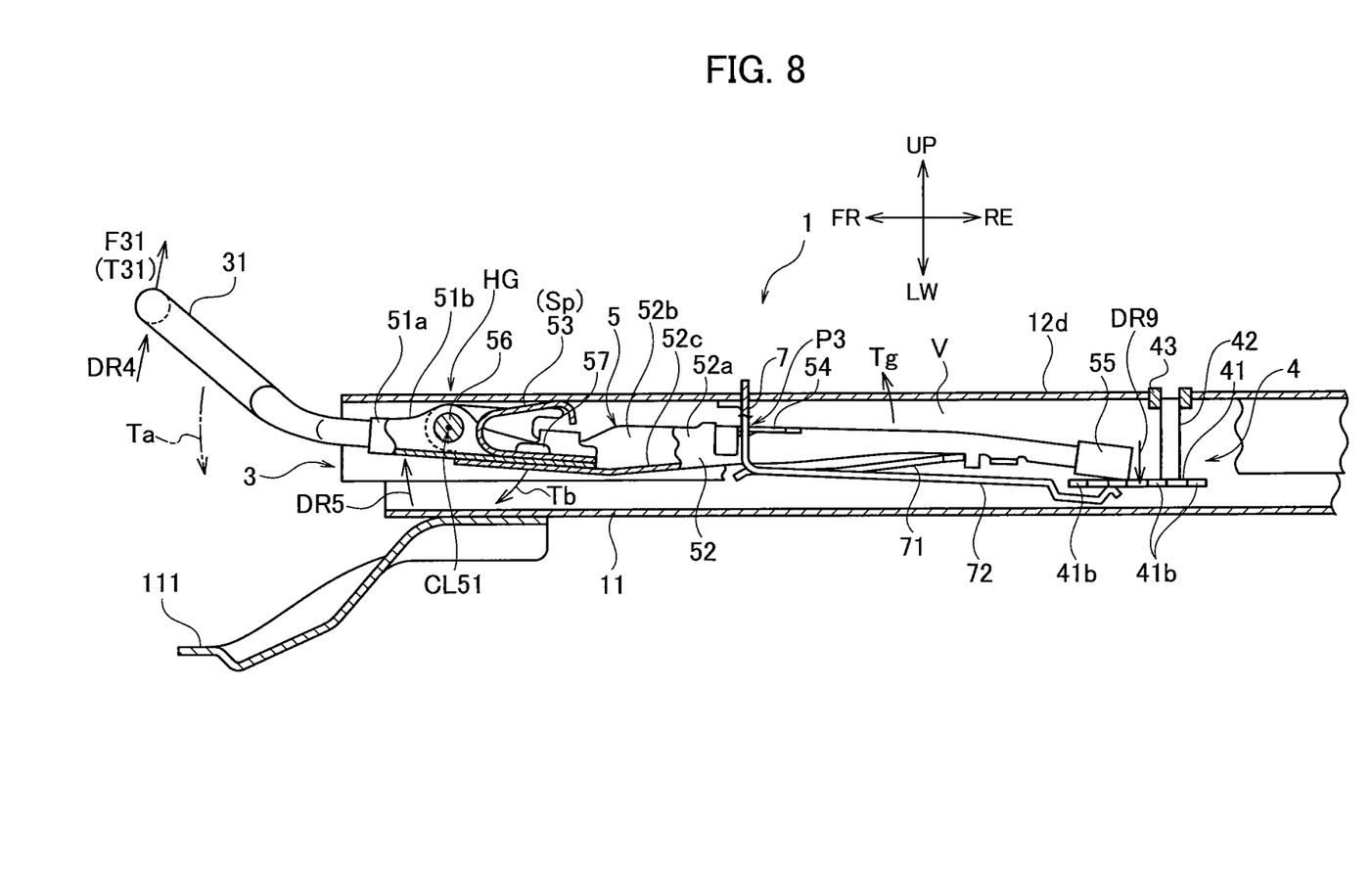
FIG. 8 is a longitudinal cross-sectional view of the front part of the outer slider in the unlocked state.

FIG. 2 is a cross-sectional view at position S2-S2 of FIG. 1. FIG. 3 is a partial sectional view of the outer slider 1 of the seat slide device 91 in a locked state at the position S3-S3 of FIG. 2. FIG. 4 is a partial sectional view of the outer slider 1 in an unlocked state at the S3-S3 position of FIG. 2. FIG. 5 is a perspective view illustrating a towel bar assembly 3 of the seat slide device 91. FIG. 6 is an exploded view of an outer assembly 5 of the towel bar assembly 3. FIG. 7 is a longitudinal cross-sectional view of the front part of the outer slider 1 in the locked state. FIG. 8 is a longitudinal cross-sectional view of the front part of the outer slider 1 in the unlocked state.

As illustrated in FIG. 2, the fixed rail 11 has a bottom wall 11d, a pair of sidewalls 11a, and a pair of retaining parts 11b in a cross-sectional shape. The cross sectional shape of the fixed rail 11 is formed into a substantially squared U-shape. This cross section shape of the fixed rail 11 is a symmetrical shape. The bottom wall 11d is a plate-like portion that extends long in the front-rear direction. Each side wall 11a of the pair of sidewalls 11a is a wall-shaped portion that rises upward from a left end and a right end of the bottom wall 11d. Each retaining part 11b of the pair of retaining parts 11b is a wall-shaped portion that is folded in an inverted L-shape at an upper end of each of the pair of sidewalls 11a and that extends downward.

The movable rail 12 has a top wall 12d, a pair of sidewalls 12a, and a pair of folded parts 12b in a cross-sectional shape. The cross sectional shape of the movable rail 12 is formed into a substantially squared U-shape. This cross section shape of the movable rail 12 is a symmetrical shape. The top wall 12d is a plate-like portion that extends long in the front-rear direction. Each side wall 12a of the pair of sidewalls 12a is a wall-shaped portion that is bent downward from a left end and a right end of the top wall 12d. Each folded part 12b of each of the pair of folded parts 12b is a wall-shaped portion that is connected at a lower end of each of the pair of, sidewalls 12a and that is folded outward and upward in the lateral direction.

As illustrated in FIGS. 3 and 4, the retaining part 11b of the fixed rail 11 has a plurality of cutouts 11c being cut upward from a lower edge of the fixed rail 11 and arranged at a same pitch PT1, each cutout 11c being cut in a same rectangular shape. The plurality of cutouts 11c are formed in a part substantially at a center in a longitudinal direction of the fixed rail 11.

As illustrated in FIGS. 3 and 4, the folded portion 12b of the movable rail 12 has a plurality of insertion holes 12c arranged at a same pitch PT1, each insertion hole 12c being formed in a same rectangular shape. The plurality of insertion holes 12c are formed at a part substantially at a center in a longitudinal direction of the movable rail 12, A number of the insertion holes 12c is smaller than a number of the cutouts 11c. In this embodiment, there are four insertion holes 12c.

As illustrated in FIG. 2, the folded portion 12b of the movable rail 12 is positioned at inner side the retaining part 11b of the fixed rail 11, and the top wall 12d projects upward from an opening at an upper part of the fixed rail 11. The movable rail 12 is inserted into and engaged with the fixed rail 11 so as not to contact the fixed rail 11 via an intervening member (not illustrated). The movable rail 12 is guided and slid in the longitudinal direction of the fixed rail 11.

As illustrated in FIGS. 2 and 7, a sleeve 43 is attached to the movable rail 12 at a part substantially at a center in the longitudinal direction of the top wall 12d. A latch shaft 42 is vertically movably inserted into the sleeve 43 within a predetermined moving range. The latch plate 41 having a rectangular shape is attached to a lower end of the latch shaft 42 with the front-rear direction of the latch plate 41 as the longitudinal direction. The latch plate 41 has a plurality of protrusions 41*b* protruding from left edge and right edge of the latch plate 41 and protruding toward left and right, respectively, and the plurality of protrusions 41*b* being arranged at the pitch PT1. There are four protrusions 41*b* in this example.

As illustrated in FIGS. 3 and 4, the four protrusions 41*b* are inserted into the four insertion holes 12*c* of the movable rail 12, respectively. While the latch plate 41 is in a locked position as illustrated in FIG. 3, the locked position being an upper position of a predetermined moving range of the latch plate 41, the protrusions 41*b* engage with the cutouts 11*c* of the fixed rail 11. Further, while the latch plate 41 is in an unlock position as illustrated in FIG. 4, the unlock position being a lower position of the predetermined moving range of the latch plate 41, the protrusion 41*b* cannot be engaged with the cutouts 11*c*.

Thus, the movement restricting portion 4 can put the movable rail 12 in the locked state, in which state the movable rail 12 is unmovable with respect to the fixed rail 11 by engaging the latch plate 41, the latch plate 41 being at the locked position, with the cutout 11*c*. Further, the movement restricting portion 4 can put the movable rail 12 in an unlocked state, in which state the movable rail 12 is movable with respect to the fixed rail 11 by placing the latch plate 41 in the unlock position so as not to be engaged with the cutout 11*c*.

As illustrated in FIG. 7, a spring plate 7 is attached to a part on the top wall 12*d* of the movable rail 12 that is at a front side with respect to the sleeve 43. The spring plate 7 is formed of a thin plate material for a spring. Specifically, the spring plate 7 has a base part 73, a first biasing part 71, and a second biasing part 72. An upper end part of the base part 73 is attached to the top wall 12*d* of the movable rail 12.

The base part 73 is a part whose upper part is fixed to the top wall 12*d* and extends downward. A lower end part of the base part 73 is positioned near the bottom wall 11*d* of the fixed rail 11. The first biasing part 71 is a portion extending rearward from the lower end part of the base part 73 in a strip-like shape. The second biasing part 72 is a strip-like part that extends rearward longer than the first biasing part 71 in parallel with the first biasing part 71 in the lateral direction. The first biasing part 71 and the second biasing part 72 function as a leaf spring, the leaf spring having a connection portion with the base part 73 as a fulcrum and a distal end side configured to elastically deform in the vertical direction. The first biasing part 71 biases the bracket 52 upward, and the second biasing part 72 biases the latch plate 41 upward.

Next, a configuration of the towel bar assembly 3 will be described with reference to FIGS. 5 and 6. The towel bar assembly 3 has the towel bar 31, an outer assembly 5 and an inner assembly 6. The outer assembly 5 and the inner assembly 6 have the same structure, and are connected and integrated by the towel bar 31. The outer assembly 5 and the inner assembly 6 are arranged at the same position in the vertical direction in the seat slide device 91 and arranged apart in parallel in the left-right directions.

The towel bar 31 has a grip portion 31*a*, a pair of bent portions 31*b*, and a pair of connecting ends 31*c*, and is formed into a substantially U-shape in a left-right symmetrical shape. The towel bar 31 is formed by bending a pipe and is arranged in the front lower part of the seat 93.

The grip portion 31*a* is a straight portion extending in the lateral direction. The pair of bent portions 31*b* are portions extending from both left and right ends of the grip portion 31*a*. The pair of bent portions 31*b* extend diagonally downward to a left outside and right outside through a plurality of bending steps. The pair of connecting ends 31*c* are parts extending rearward from the tip of each bent portion 31*a* to be parallel to each other. The pair of connecting ends 31*c* are respectively connected to a front end of the outer assembly 5 and a front end of the inner assembly 6.

As illustrated in FIG. 6, the outer assembly 5 includes the support bracket 51, the bracket 52, a leaf spring 53, an upper bracket 54, a cover 55, a pin 56, and a blind rivet 57.

The bracket 52 has a bottom wall 52*c*, which is longitudinally elongated, and sidewalls 52*a*, 52*b* raised from right and left edges of the bottom wall 52*c*. A cross sectional shape of the bracket 52 is generally formed in a squared U-shape. At a front side part of each sidewall 52*a*, 52*b*, through holes 52*a*1 and 52*b*1 are formed concentrically with an axis CL52 extending in the lateral direction as an axial center.

The support bracket 51 is formed to be about ¼ length of the bracket 52. The support bracket 51 has a bottom wall 51*c*, which is longitudinally elongated, and sidewalls 51*a* and 51*b* raised from right and left edges of the bottom wall 51*c*. A cross sectional shape of the support bracket 51 is formed into a squared U-shape. At a portion substantially at a center in a longitudinal direction of each sidewall 51*a*, 51*b*, through-holes 51*a*1 and 51*b*1 are formed concentrically with an axis CL51 extending in the lateral direction as an axial center. The through-holes 51*a*1, 51*b*1, 52*a*1, 52*b*1 are formed to have a same inner diameter.

The support bracket 51 is fitted between the sidewalls 52*a*, 52*b* of the bracket 52 at a position where the axis CL51 coincide with the axis CL52. The pin 56 is inserted into the through holes 52*b*1, 51*b*1, 51*a*1, 52*a*1 and is fastened to the support bracket 51 and the bracket 52. Thus, the support bracket 51 is rotatably attached to the bracket 52 about the axis CL51 (CL52). The hinge part HG includes through holes 51*a*1, 51*b*1 of the support bracket 51, through holes 52*a*1, 52*b*1 of the bracket 52, and the pin 56. At the hinge part HG, a rotation of the support bracket 51 in the clockwise direction, as illustrated in FIGS. 6 and 7, is rotatable up to a rotation position of a normal orientation, the normal orientation being an orientation of the support bracket 51 where the bottom wall 51*c* of the support bracket 51 abuts on the bottom wall 52*c* of the bracket 52. As for the rotation of the support bracket 51, only rotation in one direction, which is the counterclockwise direction in FIGS. 6 and 7, is permitted from the normal orientation.

At a front end of the support bracket 51, the connecting end 31*c* of the towel bar 31 is fixed by welding.

As illustrated in FIGS. 6 and 7, at a rear side relative to the axis CL51 on an upper surface of the bottom wall 51*c* of the support bracket 51, the leaf spring 53 is fixed by the blind rivet 57. The leaf spring 53 has a base portion 51*a*, which adheres to the bottom wall 51*c* and is riveted to the bottom wall 53*c*, and an arm portion 53*b* which extends obliquely upward and rearward at a predetermined angle from a front end of the base portion 53*a*. The arm portion 53*b* is flexible in an angle-increasing/angle-decreasing direction at a predetermined angle with respect to the base portion 53*a*.

At a substantially central portion in the longitudinal direction of the bracket 52, an upper bracket 54 configured to close a gap between the sidewall 52*a* and the sidewall 52*b* is fixed. A cover 55 made of resin is attached to a rear end of the bracket 52. As will be described later, the cover 55 is a member configured to abut against the upper surface of the latch plate 41 when the latch plate 41 is pressed down.

As illustrated in FIGS. 7 and 8, the outer assembly 5 is accommodated in a space V formed inside the outer slider 1. In a normal state, the normal state being a state in which the outer assembly 5 is accommodated in the space V, the base part 73 of the spring plate 7 abuts against a position P2 at a lower edge of the bracket 52 and support the outer assembly 5. The base part 73 abuts on the upper bracket 54 at a position P3 when the outer assembly 5 moves upward along with the towel bar 31 being lifted for unlocking. The position P2 and the position P3 are configured to be set as fulcrums at an intermediate part in the longitudinal direction of the bracket 52. The bracket 52 is disposed to be swingable so that the front side and the rear side swing opposite to each other in a vertical direction with respect to the position P2 and the position P3.

The inner assembly 6 illustrated in FIG. 5 has a same structure as the outer assembly 5. That is, the inner assembly 6 has a support bracket 61, a bracket 62, a leaf spring 63, an upper bracket 64, a cover 65, a pin 66, and a blind rivet 67 corresponding to the support bracket 51, the bracket 52, the leaf spring 53, the upper bracket 54, the cover 55, the pin 56, and the blind rivet 57, respectively.

The connecting end 31c on an inner side of the towel bar 31 is fixed by welding at a front end of the support bracket 61 of the inner assembly 6. The inner assembly 6 is accommodated inside the inner slider 2.

Next, referring to FIGS. 7 and 8, an operation mode of locking and unlocking the movable rail 12 by the outer assembly 5 accommodated in the outer slider 1 will be described as a representative of the operation mode in the outer slider 1 and the inner slider 2.

As illustrated in FIG. 7, the outer assembly 5 is accommodated in the space V in a manner that the grip portion 31a and the bent portion 31b of the towel bar 31 are exposed at front side. As described above, in the normal state, the lower edge of the bracket 52 is supported at the position P2 by the base part 73 of the spring plate 7. When the bracket 52 is lifted up, the upper bracket 54 is brought into contact with the base part 73 at the position P3 and restricts movement of the bracket 52.

The first biasing part 71 of the spring plate 7 constantly biases upward and lifts a portion rearward of the position P2 at the lower edge of the bracket 52 (see arrow DR1). The arm 53b of the leaf spring 53 is bent by abutting on the inner surface of the top wall 12d of the movable rail 12. The support bracket 51 is constantly biased downward by an elastic repulsive force of the leaf spring 53 caused by the bending of the leaf spring 53 (see arrow DR2). That is, in the locked state illustrated in FIG. 7, the bracket 52 is biased by the first biasing part 71 and the leaf spring 53 so as to rotate counterclockwise in FIG. 7 with the position P2, where the spring plate 7 abuts, as a fulcrum. As a result, the bracket 52 rotates counterclockwise, and the cover 55 abuts on the inner surface of the top wall 12d of the movable rail 12, and the rotation of the bracket 52 is restricted and an orientation of the bracket 52 is retained.

The latch plate 41 is constantly biased upward by the second biasing part 72 of the spring plate 7 (see arrow DR3). The latch plate 41 is retained in the locked position illustrated in FIG. 7 unless another external force is applied. This locked position of the latch plate 41 is a position illustrated in FIG. 3 and allows the latch plate 41 to enter the cutout 11c of the fixed rail 11 so that the movable rail 12 cannot slide relative to the fixed rail 11. In the locked state, the cover 55 of the outer assembly 5 is at a position upward of and separated from the latch plate 41.

From the locked state illustrated in FIG. 7, when the grip portion 31a of the towel bar 31 is lifted up (see the arrow DR4 in FIG. 8) by an occupant on the seat 93 or the like, the outer slider 1 goes into the unlocked state. More specifically, when the grip portion 31a of the towel bar 31 is lifted by a hand of the occupant or the like, the support bracket 51, to which the connecting end 31c of the towel bar 31 is fixed, is also lifted integrally.

The support bracket 51 is restricted from rotating in clockwise direction in FIG. 8 about the axis CL51 with respect to the bracket 52. Further, the upward movement of the position P3 of the bracket 52 is restricted by an abutment of the upper bracket 54 with the base part 73 of the spring plate 7. Therefore, when the grip portion 31a of the towel bar 31 is lifted, the bracket 52 and the support bracket 51 are lifted integrally. The bracket 52 and the support bracket 51 are lifted so as to rotate clockwise in FIG. 8 with the position P3 as a rotation center (see arrow DR5).

A force F31 applied to the grip portion 31a by lifting the grip portion 31a generates a torque T31 in clockwise direction around the position P3. A resultant force of the repulsive force of the leaf spring 53 and repulsive force of the first and second biasing parts 71 and 72 generates a spring group combined torque Tg which is a combined torque in the counterclockwise direction around the position P3. In the outer slider 1, spring constants of the leaf spring 53 and the spring plate 7 are set so that the torque T31 generated by the normal unlocking operation is larger than the magnitude of the spring group combined torque Tg.

Since the torque T31 is set to be larger than the spring group combined torque Tg, when the bracket 52 is rotated clockwise, the latch plate 41 is pushed down by the cover 55 (see arrow DR9). Thus, the latch plate 41 is lowered to the unlock position, and the locking of the slide movement of the movable rail 12 relative to the fixed rail 11 in the outer slider 1 is released. In the same operation, a locking of the slide movement of the movable rail 22 relative to the fixed rail 21 in the inner slider 2 is also released. Thus, the locking of the slide movement of the seat 93 with respect to the floor 92 is released, and the seat 93 can be slidably moved.

When the occupant releases the force of lifting the grip portion 31a applied to the towel bar 31, the outer assembly 5 is rotated counterclockwise in FIG. 8 by the spring group combined torque Tg. The latch plate 41 then rises to the locked position and returns to the locked state illustrated in FIG. 7.

Thus, the movable rail 12 and the seat 93 connected to the movable rail 12 can be locked at a desired position.

Since the seat slide device 91 has the above-described structure, even when the floor 92 is deformed by an external force applied by a collision of a vehicle or the like, the locking of the slide movement of the seat 93 is less likely to be released. This will be described with reference to FIGS. 9 and 10.

Figure 9:
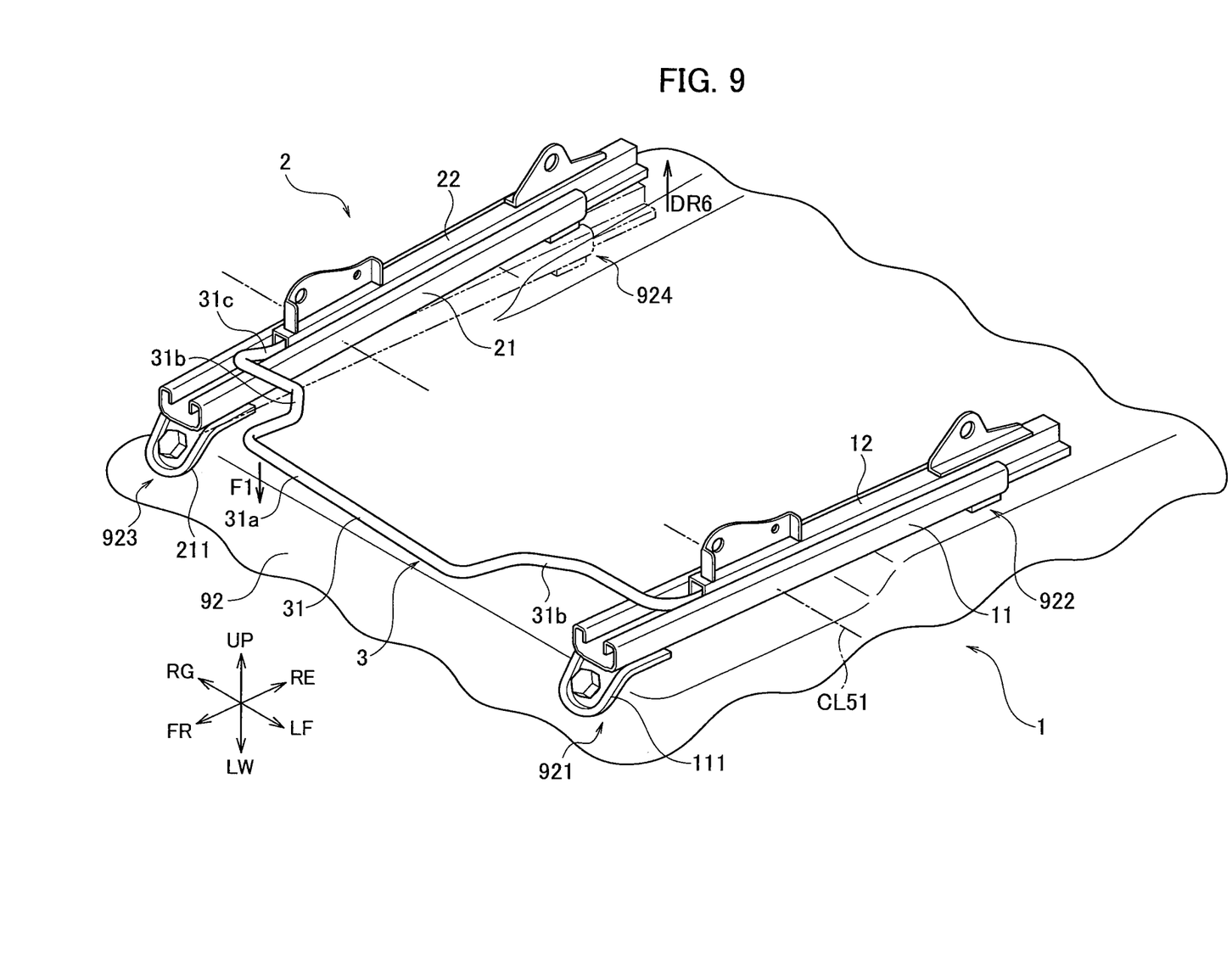
FIG. 9 is a perspective view illustrating a state of the seat slide device after the floor has been deformed.

FIG. 9 illustrates an example of the floor 92 being deformed caused by a collision of a vehicle. More specifically, this is an example in which the floor fixing portions 921-923 is not largely deformed but a part in the vicinity of the floor fixing portion 924, to which the rear end portion of the inner slider 2 is fixed, is greatly deformed by being lifted upward (see arrow DR6). In the deformed state of the floor 92, as illustrated in FIG. 10, the inner slider 2 (illustrated by a dashed-and-double-dotted line) is raised and is in an inclined orientation as indicated by an arrow DR7 on the rear side with respect to the outer slider 1 (illustrated by a solid line) maintaining the normal orientation.

When an orientation of the inner slider 2 is in the inclined orientation that the rear part is lifted up and the front part is relatively lowered, a force F1 forcing the connecting end 31*c* and the bent portion 31*b* on the inner slide body 2 side of the towel bar 31 to move downward is applied to the connecting end 31*c* and the bent portion 31*b* as illustrated in FIG. 9. This force F1 is transmitted to the bent portion 31*b* and the connecting end 31*c* on the outer slider 1 side of the towel bar 31 via the grip portion 31*a*.

The support bracket 51 is configured to rotate the towel bar 31 downward about the axis CL51 with respect to the bracket 52. The support bracket 51 of the outer slider 1 is configured to independently rotate in the counterclockwise direction of FIG. 10 by the force F1 applied to the towel bar 31 (see arrow DR8).

Figure 10:
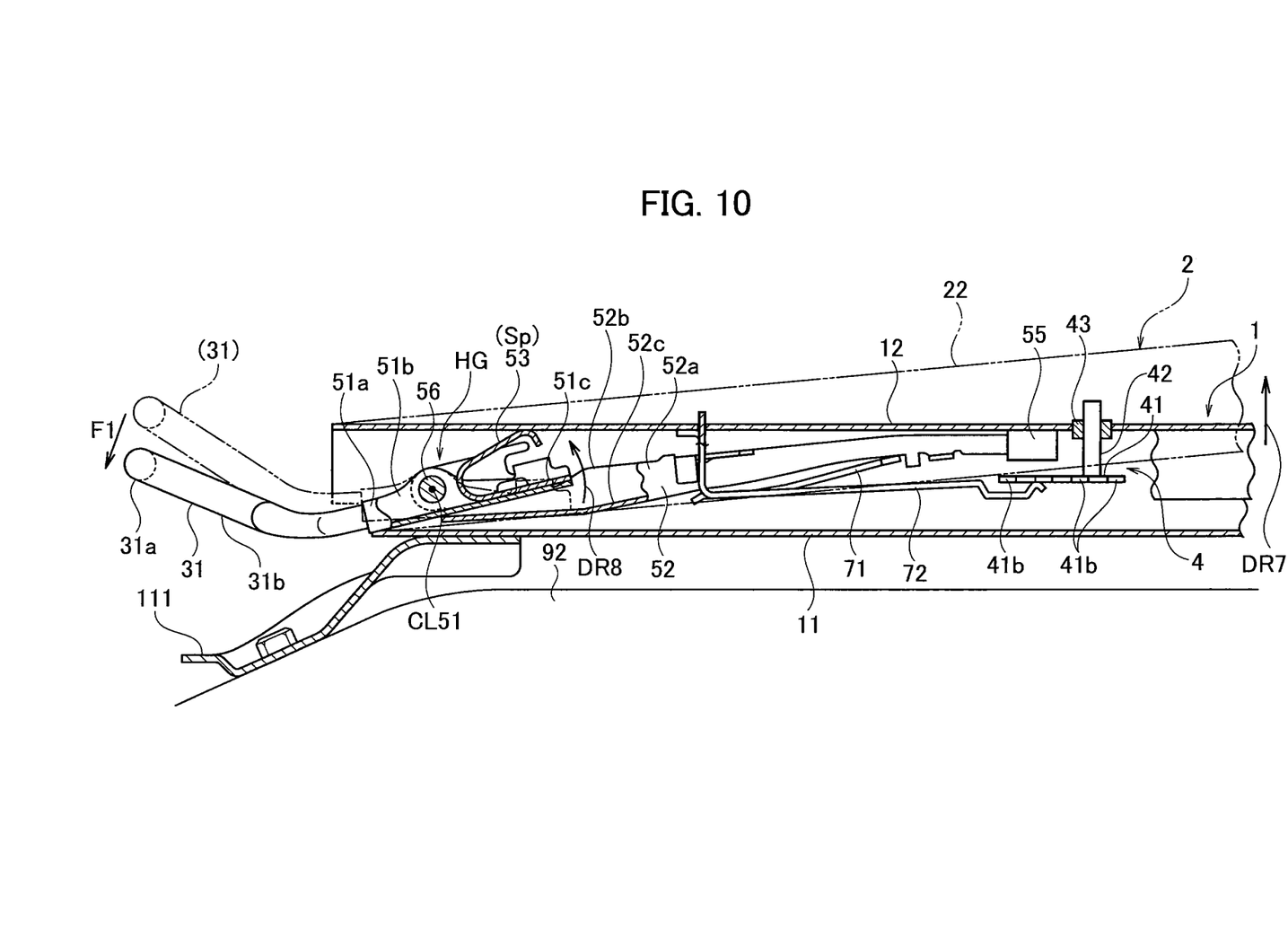
FIG. 10 is a longitudinal sectional view of the front part of the outer slider after the floor has been deformed.

That is, the towel bar 31 rotates from a position illustrated by a dashed-and-double-dotted line in FIG. 10 to a lowered position illustrated by a solid line. Therefore, a torsional reaction force against the force F1 from the outer slider 1 side does not work on the connecting end 31*c* of the towel bar 31 on the inner slider 2 side. Therefore, the towel bar 31 can be inclined along the inclination of the inner slider 2 with the deformation of the floor 92, the deformation being a lifting of the rear part of the inner slider 2. Accordingly, the locked state of the inner slider 2 is retained together with the locked state of the outer slider 1. Thus, the seat slide device 91 is configured so as the locking of the slide movement is less likely to be released even when the floor 92 is deformed.

On the contrary, if the support bracket is non-rotatably integrated with the bracket 52, when the force F1 is applied to a first part of the towel bar 31 on a side connected to the inner slider 2, a second part of the towel bar 31 on a side connected to the outer slider 1 retains an orientation as it is. Therefore, the first part of the towel bar 31 on the inner slider 2 side receives a torsional reaction force from the outer slider 1 side, the torsional reaction force caused by the force F1, and retains the orientation illustrated by the dashed-and-double-dotted line in FIG. 10. Therefore, if the support bracket 51 is non-rotatably integrated with the bracket 52, the towel bar 31 may be lifted relative to the inner slider 2, while the inner slider 2 is inclined so that the rear part is lifted by deformation of the floor 92, and the locking may be released. It can be seen that the seat slide device 91 prevents releasing of the locking of the slide movement of the movable rail 12 as described above and is configured to retain the locking state satisfactorily even when the floor 92 is deformed.

The seat slide device 91 has a hinge part HG, in which the support bracket 51 is rotatable relative to the bracket 52, for example in an outer assembly 5. Therefore, a torque Ta in a counterclockwise direction as indicated by an arrow of dashed-dotted line in FIG. 8 is constantly generated by a total mass of a portion of the support bracket 51 on the front side of the axis CL5 and a mass of the towel bar 31 fixed to the portion of the support bracket 51. The same applies to the inner assembly 6 having the same structure as the outer assembly 5.

Therefore, in the normal state, the seat slide device 91 is provided with a biasing member Sp, which generates a torque Tb in a clockwise direction in FIG. 8 exceeding the torque Ta. In the outer assembly 5, the biasing member Sp is the leaf spring 53. In the leaf spring 53, the base portion 53*a* is fixed to a portion on the right side of the axis CL51 of the support bracket 51, and the arm portion 53*b* is configured to elastically press the inner surface of the top wall 12*d* of the movable rail 12. The spring constant of the leaf spring 53 is set to generate the torque Tb in the normal state, the torque Tb being a torque around the axis CL51 in a direction opposite to and greater in magnitude than the torque Ta based on a weight of the towel bar 31 or the like. As described above, the spring group combined torque Tg is set to be a torque in a direction opposite to and smaller in magnitude than the torque T31 to be rotated so as to lift the grip portion 31*a* applied from the occupant. The same applies to the inner assembly 6 having the same structure as the outer assembly 5.

As described above, since the seat slide device 91 is provided with the hinge part HG, even when the floor 92 is deformed, the locking of the slide movement of the seat 93 is less likely to be released. Further, since the seat slide device 91 has a biasing member Sp configured to restrict the rotation of the support bracket 51 at the hinge part HG, the rotation caused by the weight of the towel bar 31 and the like, the towel bar 31 does not move downward by the weight of the towel bar 31 at the front side in the normal state. Further, since the spring constant of the biasing member Sp is appropriately set, the brackets 52 and 62 are less likely to be pushed down and be released from the locking state in the normal state, and the force by which the occupant lifts the grip portion 31*a* of the towel bar 31 for releasing the locking is prevented from being excessive.

The present invention is not limited to the embodiments described above, and various modifications can be made without departing from the scope of the present invention.

The biasing member Sp is not limited to a leaf spring, but may be an elastic member such as a coil spring or a rubber. The mechanism for locking the slide movement of the movable rail 12 is not limited to the structure of the movement restricting portion 4 described in the above described embodiment, and may be any structure that can be locked at the normal position of the towel bar 31 and be unlocked by lifting the grip portion 31*a* of the towel bar 31. The seat slide device 91 is not limited to one mounted on an automobile. As vehicles on which the seat slide device 91 can be mounted, there are various types of vehicles such as railways, ships, and airplanes and other vehicles.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions,

What is claimed is:

1. A seat slide device comprising:
   an inner slider and an outer slider disposed apart from each other in a lateral direction of a floor of a vehicle, each of the inner slider and the outer slider comprises
   a fixed rail laid on the floor in a position extending in a front-rear direction,
   a movable rail fixed to a lower portion of a seat of the vehicle and configured to be slidably guided by the fixed rail,
   a bracket disposed on the movable rail with the front-rear direction as a longitudinal direction and configured so that a front side and a rear side swing opposite to each other in a vertical direction with a longitudinal intermediate part as a fulcrum,
   a support bracket mounted onto the bracket via a hinge part arranged on the front side of the fulcrum on the bracket and configured to be rotate in only one direction from a predetermined normal orientation about an axis extending in the lateral direction with respect to the bracket, and a movement restricting portion configured to restrict sliding movement of the movable rail while a rear end of the bracket is raised and to release the restriction against sliding movement of the movable rail while the rear end of the bracket is lowered; and a towel bar arranged at a front lower part of the seat and connected and fixed to a front part of the support bracket of the inner slider and a front part of the support bracket of the bracket of the outer slider so as to be connected to each of the inner slider and the outer slider, wherein when the support bracket is in the predetermined normal orientation, the hinge part prohibits a rotation of the support bracket while the towel bar is lifted, so that the support bracket and the bracket are integrally lifted, and the hinge part permits the rotation of the support bracket while the towel bar is lowered, so that the front part of the support bracket is lowered independently with respect to the bracket.

2. The seat slide device according to claim 1, wherein each of the inner slider and the outer slider further comprises a biasing member, the biasing member configured to bias the support bracket to be in a rotational position of the normal orientation with respect to the bracket.

* * * * *